(12) United States Patent
Benke et al.

(10) Patent No.: US 9,569,108 B2
(45) Date of Patent: Feb. 14, 2017

(54) DATASET REPLICA MIGRATION

(71) Applicant: International Business Machines Corporation, Armonk, NY (US)

(72) Inventors: Oliver Benke, Stuttgart (DE); Jan Kunigk, Nufringen (DE); Stefan Letz, Markranstaedt (DE); Joerg-Stephan Vogt, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 14/270,407

(22) Filed: May 6, 2014

(65) Prior Publication Data

US 2015/0324388 A1 Nov. 12, 2015

(51) Int. Cl.
*G06F 17/30* (2006.01)
*G06F 3/06* (2006.01)
*G06F 11/14* (2006.01)

(52) U.S. Cl.
CPC ............. *G06F 3/06* (2013.01); *G06F 3/065* (2013.01); *G06F 3/067* (2013.01); *G06F 3/0619* (2013.01); *G06F 3/0652* (2013.01); *G06F 11/1479* (2013.01); *G06F 17/30088* (2013.01); *G06F 17/30212* (2013.01)

(58) Field of Classification Search
CPC ............. G06F 17/30575; G06F 17/30174; G06F 17/30286; G06F 17/30067; G06F 17/30008
See application file for complete search history.

(56) References Cited

U.S. PATENT DOCUMENTS

| 5,771,354 | A | * | 6/1998 | Crawford | G06F 9/5061 |
| | | | | | 707/999.202 |
| 8,356,303 | B2 | | 1/2013 | Sengupta et al. | |
| 2002/0091697 | A1 | * | 7/2002 | Huang | G06F 17/30867 |
| 2009/0006489 | A1 | * | 1/2009 | Ramasubramanian | G06F 17/30176 |
| 2011/0161294 | A1 | | 6/2011 | Vengerov et al. | |
| 2013/0290249 | A1 | * | 10/2013 | Merriman | G06F 17/30578 |
| | | | | | 707/610 |
| 2014/0149355 | A1 | * | 5/2014 | Gupta | G06F 17/30008 |
| | | | | | 707/652 |

OTHER PUBLICATIONS

Mell et al., "The NIST Definition of Cloud Computing", National Institute of Standards and Technology, NIST Special Publication 800-145, Sep. 2011, Gaithersburg, MD.
List of IBM Patents or Patent Applications Treated as Related, Jun. 16, 2014.
Benke et al., "Dataset Replica Migration", U.S. Appl. No. 14/305,401, filed Jun. 16, 2014.

\* cited by examiner

*Primary Examiner* — Cam-Y Truong
(74) *Attorney, Agent, or Firm* — Laura E. Gisler

(57) ABSTRACT

A method of dataset replica migration is described. An application session may start on a first compute node. A first replica of the dataset to be accessed by the application session may be located on a second compute node. A second replica of the dataset is created to be co-located with the first compute node. A first data block of the dataset may be requested by the application session. The first data block of the first replica of the dataset may be read from the second compute node, when the second replica does not have a copy of the first data block stored in the second replica. The retrieved first data block may be copied to the second replica. The first data block may be read from the second replica, when the first data block is requested by the application session and is contained in the second replica.

7 Claims, 13 Drawing Sheets

DATASET REPLICA MIGRATION

BACKGROUND

The present disclosure relates to storage services, and more specifically, to replica migration of data in a distributed file system.

Cloud computing is an established trend in enterprise and consumer computing, making it easier to perform computational tasks in cloud datacenters. The cloud datacenters are accessed by clients through an existing network. Some cloud based solutions keep all data in the cloud. Storage in cloud environments may be distributed on a range of dedicated storage devices such as network-attached storage (NAS) or storage area network (SAN) products or storage may be distributed across different compute nodes via the help of a distributed storage layer, which combines the local disks of all participating nodes into one consistent pool.

SUMMARY

According to embodiments of the present disclosure a method of dataset replica migration, a compute node performing the method, and a computer program product of the method are described. An application session may start on a first compute node. A first replica of the dataset to be accessed by the application session may be located on a second compute node. A second replica of the dataset is created to be co-located with the first compute node. A first data block of the dataset may be requested by the application session. The first data block of the first replica of the dataset may be read from the second compute node, when the second replica does not have a copy of the first data block stored in the second replica. The retrieved first data block may be copied to the second replica. The first data block may be read from the second replica, when the first data block is requested by the application session and is contained in the second replica.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
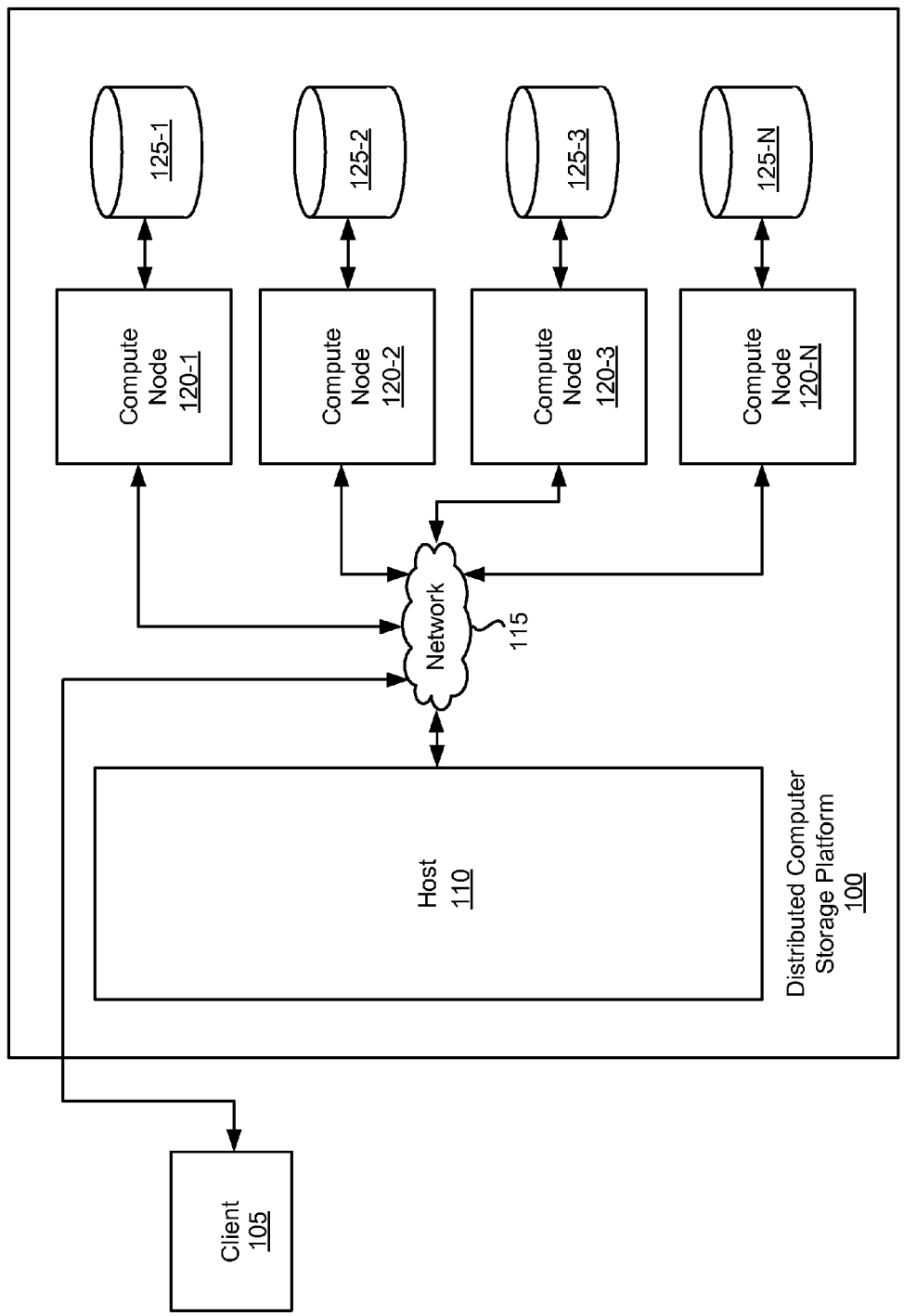
FIG. 1 illustrates an example of a distributed computer storage platform that performs the adaptive replica migration and an attached client computer system, according to various embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate storage services, and more specifically, to adaptive replica migration of datasets. A distributed computer storage platform may receive a request to begin a new application session that utilizes a replica of an existing dataset. The replica may be stored on a storage module of a compute node. A scheduler of the distributed computer storage platform may determine whether a user-defined metric is met to either start the new session on a compute node that has an existing replica or on a compute node that does not have an existing replica of the dataset co-located on an associated storage module. When the session begins on a compute node not having a replica, a new replica will be created that does not have any of the data blocks of the old replicas. As the new session reads data blocks from the old replicas on different compute nodes, copies of the data blocks may be stored in the new replica and accessed from the new replica when a read operation for the data block occurs again by the new session. Data blocks created by the new session may be written to the new replica and depending on a consistency model the new data blocks may be written to an old replica. If the new session ends before the new replica is completed, then depending on a user-defined metric the new replica can be completed when network resources are available. If the user-defined metric is not met, then the new replica may be discarded. If the new replica is completed, then an old replica may be discarded.

As stated before, cloud computing is an established trend in enterprise and consumer computing. Cloud storage service platforms may replicate a dataset to achieve acceptable availability of data in a distributed storage layer within a datacenter. In order to achieve acceptable availability of data in the distributed storage layer, several copies, i.e. replicas, of the data are created and held by different compute nodes. In addition, the service provider may choose, regardless of the choice of storage backend, to replicate data across different datacenters in order to further increase availability or performance of applications.

The number of compute nodes that take part in the distributed storage layer typically ranges from dozens to thousands of nodes. Many applications in cloud environments benefit from colocation with the user data for performance reasons. It may be beneficial to launch the application on the same node on which the data is located. Implementing replication of datasets in conjunction with colocation may yield additional benefits, since the colocation can take place on more than one node. In addition, some applications like machine learning algorithms can benefit from data replication/distribution as it may allow to parallelize the learning algorithm in the cluster. However, with typical replication factors that range between two and three and depending on the amount of user requests, there may be a shortage of available nodes to leverage application and data colocation. It may thus be beneficial to provide additional colocation computation slots by starting a new ad-hoc replica of data on a node who previously did not hold the dataset in question. The alternative to creating an additional replica is to start the application on a distant compute node while the data is not held locally on the node and fulfill all read and write requests to the data via the network via a node that contains the data.

Both scenarios, adding new replicas and distant compute nodes, incur additional traffic on the network that impact performance and cost of the overall service. However, in many scenarios, the process of creating a new replica may be more beneficial than distant compute nodes. The new replica may reduce network traffic when the additional replica works like a cache. When data is used frequently, the new network replica acting as a cache, reduces traffic overall. A method of creating a new replica and handling old replicas on a distributed file system is described herein.

FIG. 1 illustrates an example of a distributed computer storage platform 100 that performs the adaptive replica migration and an attached client computer system 105, according to various embodiments. The distributed computer storage platform 100 may include one or more host servers 110, a plurality of compute nodes 120-1-120-N, and a plurality of storage modules 125-1-125-N. The compute nodes 120-1-120-N may collectively be referred to as compute nodes 120 and the storage modules 125-1-125-N may be collectively referred to as storage modules 125. The compute nodes 120 may be communicatively coupled with the host 110, the client computer 105, and each other over a network 115. Each compute node 120 may be communicatively coupled with one or more storage modules 125. In various embodiments, the compute nodes 120 and their corresponding storage module 125 may be in colocation.

Each distributed computer storage platform 100 may contain one or more host servers 110 that run applications of the distributed computer storage platform 100. If the distributed computer storage platform 100 has more than one host server 110, then one host server 110 may be the active or primary host while the other is a standby host ready to take over if the active host fails.

The compute nodes 120 may provide the central processing units (CPU), and memory for the distributed computer storage platform 100. Each processor may have multiple CPUs. Each compute node 120 may be in communication with one or more storage modules 125. The storage modules 125 are the storage media for the user datasets that are managed by the distributed computer storage platform 100. The storage modules 125 may be magnetic disk drives and solid state drives, for example. Each dataset may be completely stored on a single storage module 125. Replicas of the dataset may be stored one or more storage modules 125 other than the original dataset. A compute node 120 may be assigned to each storage module 125.

The distributed computer storage platform 100 may receive a request to begin a new application session that utilizes a replica of an existing dataset that may be stored on a storage module 125 of a compute node 120. A scheduler of the distributed computer storage platform may determine whether a user-defined metric is met to either start the new session on a compute node 120 that has an existing replica or on a compute node 120 that does not have an existing replica of the dataset co-located on its corresponding storage module 125. When the session begins on a compute node 120 not having a replica, a new replica may be created. At this point the new replica does not have any of the data blocks of the old replicas. As the new session reads data blocks from the old replica on a different compute node 120, copies of the data blocks may be stored in the new replica and accessed from the new replica when a read operation for the data block occurs again by the new session. Data blocks created by the new session may be written to the new replica and depending on a consistency model the new data blocks may be written to the old replica. If the new session ends before the new replica is completed, then depending on a user-defined metric the new replica can be completed when network resources are available or discarded. If the new replica is completed, then an old replica may be discarded.

Figure 2:
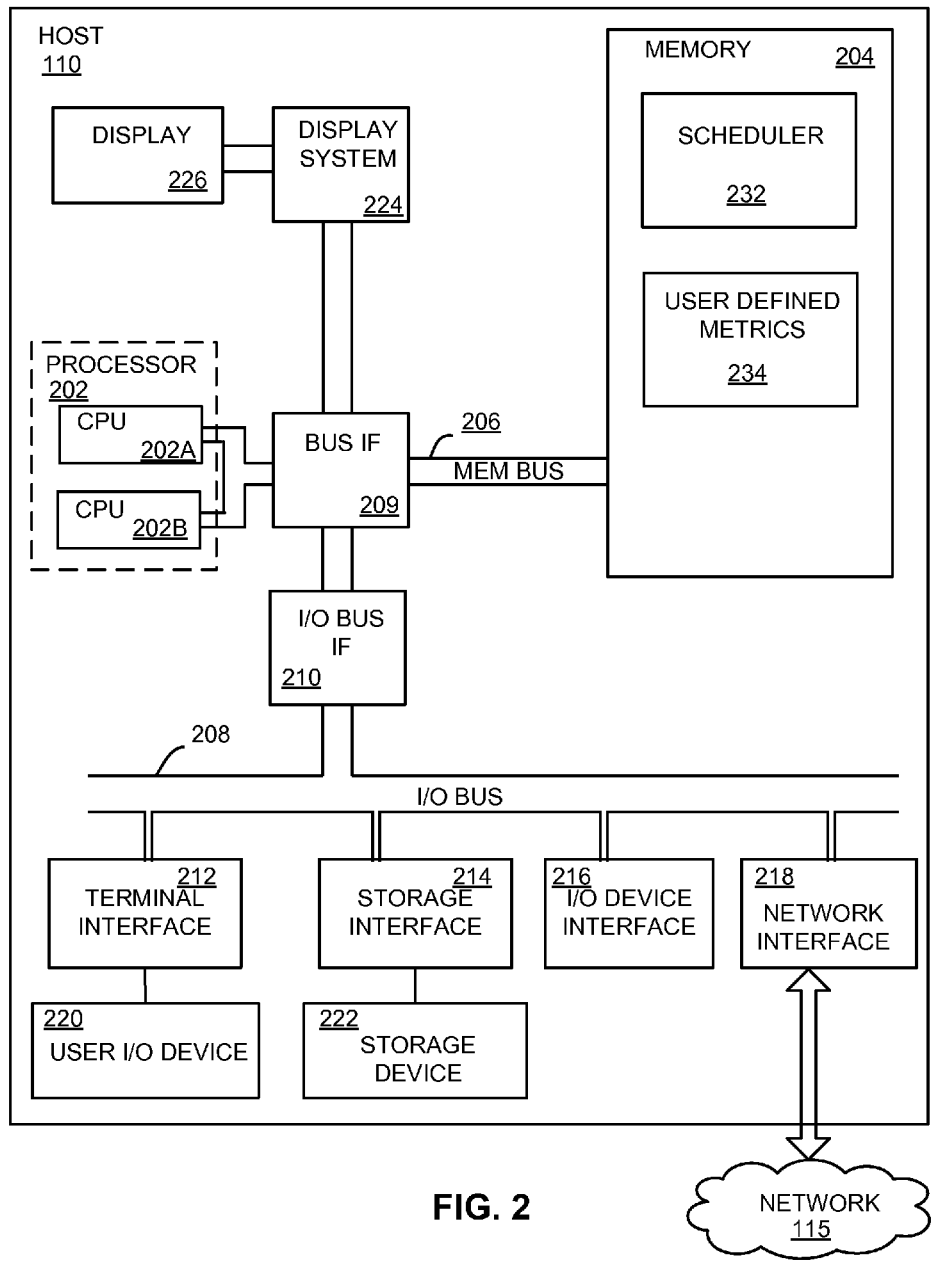
FIG. 2 is a schematic block diagram illustrating various embodiments of the host server or FIG. 1

FIG. 2 is a schematic block diagram illustrating various embodiments of the host server 110 of FIG. 1. The host server 110 is one example context in which embodiments may be implemented. The mechanisms and apparatus of the various embodiments disclosed herein apply equally to any appropriate computing system. The major components of the host server 110 include one or more processors 202, a memory 204, a terminal interface 212, a storage interface 214, an Input/Output ("I/O") device interface 216, and a network interface 218, all of which are communicatively coupled, directly or indirectly, for inter-component communication via a memory bus 206, an I/O bus 208, bus interface unit ("IF") 209, and an I/O bus interface unit 210.

The host server 110 may contain one or more general-purpose programmable central processing units (CPUs) 202A and 202B, herein generically referred to as the processor 202. In an embodiment, the host server 110 may contain multiple processors; however, in another embodiment, the host server 110 may alternatively be a single CPU system. Each processor 202 executes instructions stored in the memory 204 and may include one or more levels of on-board cache.

In an embodiment, the memory 204 may include a random-access semiconductor memory, storage device, or storage medium (either volatile or non-volatile) for storing or encoding data and programs. In various embodiments, the memory 204 represents the entire virtual memory of the host server 110, and may also include the virtual memory of other computer systems coupled to the host server 110 or connected via a network 115. The memory 204 is conceptually a single monolithic entity, but in other embodiments the memory 204 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 204 may store all or a portion of the following: a scheduler 232 and user-defined metrics 234. These programs and data structures are illustrated as being included within the memory 204 in the host server 110, however, in other embodiments, some or all of them may be on different computer systems and may be accessed remotely, e.g., via a network 115. The host server 110 may use virtual addressing mechanisms that allow the programs of the host server 110 to behave as if they only have access to a large, single storage entity instead of access to multiple, smaller storage entities. Thus, while the scheduler 232 and the user-defined metrics 234 are illustrated as being included within the memory 204, they may not necessarily all be completely contained in the same storage device at the same time.

In an embodiment, the scheduler 232 and the user-defined metrics 234 may include instructions or statements that execute on the processor 202 or instructions or statements that are interpreted by instructions or statements that execute on the processor 202 to carry out the functions as further described below. In another embodiment, the scheduler 232 and the user-defined metrics 234 may be implemented in hardware via semiconductor devices, chips, logical gates, circuits, circuit cards, and/or other physical hardware devices in lieu of, or in addition to, a processor-based system. In an embodiment, the scheduler 232 and the user-defined metrics 234 may include data in addition to instructions or statements. In various embodiments, one or more compute nodes 120 of FIG. 1 may contain the scheduler 232 and the user-defined metrics 234.

The host server 110 may include a bus interface unit 209 to handle communications among the processor 202, the memory 204, a display system 224, and the I/O bus interface unit 210. The I/O bus interface unit 210 may be coupled with the I/O bus 208 for transferring data to and from the various I/O units. The I/O bus interface unit 210 communicates with multiple I/O interface units 212, 214, 216, and 218, which are also known as I/O processors (IOPs) or I/O adapters (IOAs), through the I/O bus 208. The display system 224 may include a display controller, a display memory, or both. The display controller may provide video, audio, or both types of data to a display device 226. The display memory may be a dedicated memory for buffering video data. The display system 224 may be coupled with a display device 226, such as a standalone display screen, computer monitor, television, or a tablet or handheld device display. In an embodiment, the display device 226 may include one or more speakers for rendering audio. Alternatively, one or more speakers for rendering audio may be coupled with an I/O interface unit. In alternate embodiments, one or more of the functions provided by the display system 224 may be on board an integrated circuit that also includes the processor 202. In addition, one or more of the functions provided by the bus interface unit 209 may be onboard an integrated circuit that also includes the processor 202.

The I/O interface units support communication with a variety of storage and I/O devices. For example, the terminal interface unit 212 supports the attachment of one or more user I/O devices 220, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 220 and the host server 110, and may receive output data via the user output devices. For example, a user interface may be presented via the user I/O device 220, such as displayed on a display device, played via a speaker, or printed via a printer.

The storage interface 214 supports the attachment of one or more disk drives or direct access storage devices 222 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 222 may be implemented via any type of secondary storage device. The contents of the memory 204, or any portion thereof, may be stored to and retrieved from the storage device 222 as needed. The I/O device interface 216 provides an interface to any of various other I/O devices or devices of other types, such as printers or fax machines. The network interface 218 provides one or more communication paths from the host server 110 to other digital devices and computer systems; these communication paths may include, e.g., one or more networks 115.

Although the host server 110 shown in FIG. 2 illustrates a particular bus structure providing a direct communication path among the processors 202, the memory 204, the bus interface 209, the display system 224, and the I/O bus interface unit 210, in alternative embodiments the host server 110 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the host server 110 may, in fact, contain multiple I/O bus interface units 210 and/or multiple I/O buses 208. While multiple I/O interface units are shown, which separate the I/O bus 208 from various communications paths running to the various I/O devices, in other embodiments, some or all of the I/O devices are connected directly to one or more system I/O buses.

In various embodiments, the host server 110 is a multi-user mainframe computer system, a single-user system, or a server computer or similar device that has little or no direct user interface, but receives requests from other computer systems (clients). In other embodiments, the host server 110 may be implemented as a desktop computer, portable computer, laptop or notebook computer, tablet computer, pocket computer, telephone, smart phone, or any other suitable type of electronic device.

Figure 3:
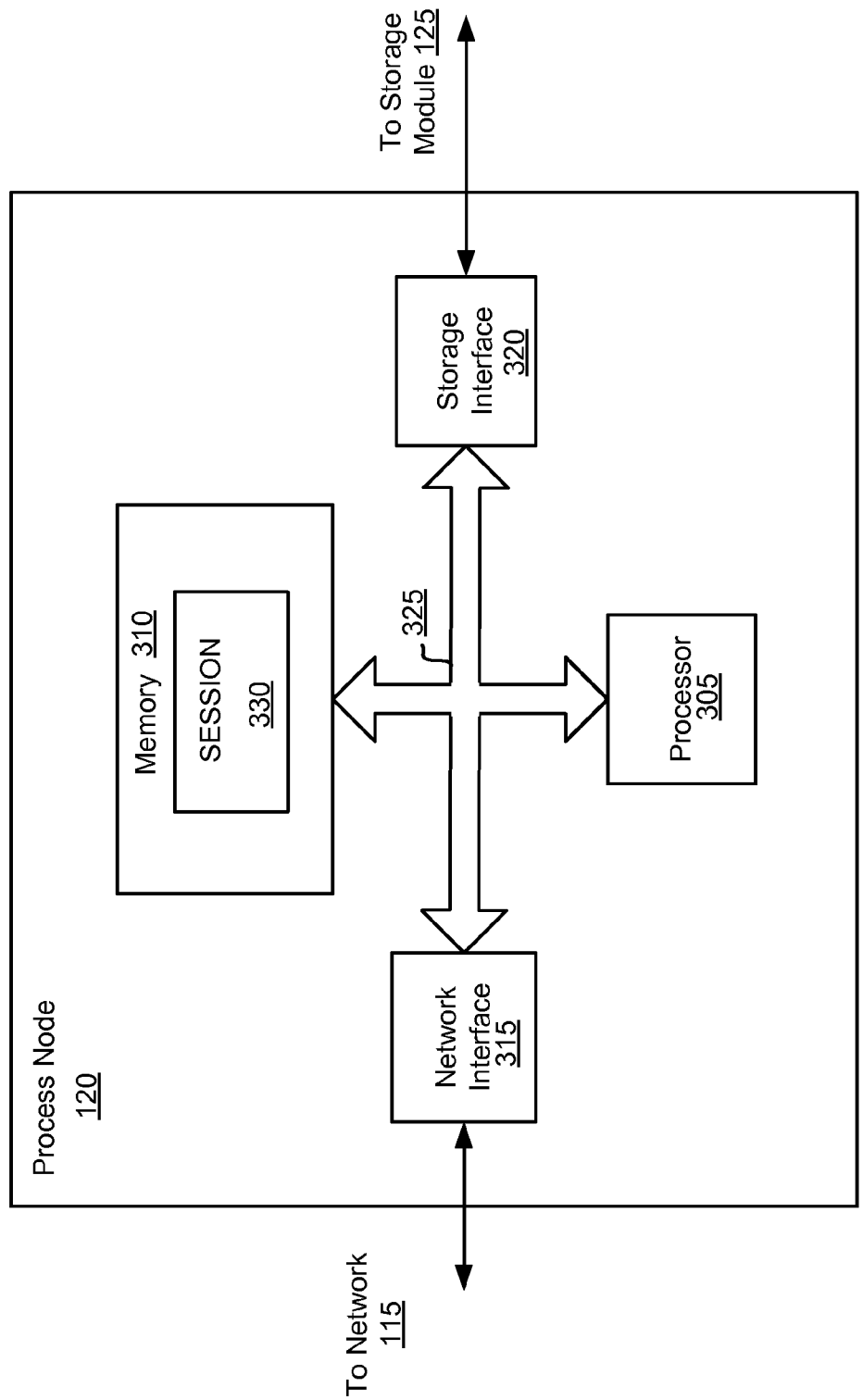
FIG. 3 is a schematic block diagram illustrating various embodiments of a compute node of FIG. 1.

FIG. 3 is a schematic block diagram illustrating various embodiments of a compute node 120. The compute node 120 is one example context in which embodiments may be implemented. The mechanisms and apparatus of the various embodiments disclosed herein apply equally to any appropriate computing system. The major components of the compute node 120 include one or more processors 305, a memory 310, a network interface 315, and a storage interface 320 all of which are communicatively coupled, directly or indirectly, for inter-component communication via a bus 325.

The compute node 120 may contain one or more general-purpose programmable central processing units (CPUs) herein generically referred to as the processor 305. In an embodiment, the compute node 120 may contain multiple processors; however, in another embodiment, the compute node 120 may alternatively be a single CPU system. Each processor 305 executes instructions stored in the memory 310 and may include one or more levels of on-board cache.

In an embodiment, the memory 310 may include a random-access semiconductor memory, storage device, or storage medium (either volatile or non-volatile) for storing or encoding data and programs. In another embodiment, the memory 310 represents the entire virtual memory of the compute node 120, and may also include the virtual memory of other computer systems coupled to the compute node 120 or connected via a network 115. The memory 310 is conceptually a single monolithic entity, but in other embodiments the memory 310 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 310 may store all or a portion of the following: an application session 330, also referred to herein as session 330. In other embodiments the memory 310 may store all or a portion of a user-defined metric 234 and a scheduler 232 in addition to the session 330. These programs and data structures are illustrated as being included within the memory 310 in the compute node 120, however, in other embodiments, some or all of them may be on different computer systems and may be accessed remotely, e.g., via a network 115. The compute node 120 may use virtual addressing mechanisms that allow the programs of the compute node 120 to behave as if they only have access to a large, single storage entity instead of access to multiple, smaller storage entities. Thus, while the session 330 is illustrated as being included within the memory 310, it may not necessarily all be completely contained in the same storage device at the same time.

In an embodiment, the session 330 may include instructions or statements that execute on the processor 305 or instructions or statements that are interpreted by instructions or statements that execute on the processor 305 to carry out the functions as further described below. In another embodiment, the session 330 may be implemented in hardware via semiconductor devices, chips, logical gates, circuits, circuit cards, and/or other physical hardware devices in lieu of, or in addition to, a processor-based system. In an embodiment, the session 330 may include data in addition to instructions or statements.

The storage interface 320 supports the attachment of one or more storage drives or direct access storage devices, such as storage module 125 (FIG. 1) (which are typically rotating magnetic disk drive storage devices, although they could alternatively be other storage devices, including arrays of disk drives configured to appear as a single large storage device to a host computer, or solid-state drives, such as flash memory). In another embodiment, the storage module 125 may be implemented via any type of secondary storage device. The contents of the memory 310, or any portion thereof, may be stored to and retrieved from the storage module 125 as needed. The I/O device interface 216 provides an interface to any of various other I/O devices or devices of other types, such as printers or fax machines. The network interface 315 provides one or more communication paths from the compute node 120 to other digital devices and computer systems; these communication paths may include, e.g., one or more networks 115.

FIG. 2 and FIG. 3 are intended to depict the representative major components of the host server 110 and compute node 120, respectively, according to various embodiments. Individual components, however, may have greater complexity than represented in FIG. 2 and FIG. 3 components other than or in addition to those shown in FIG. 2 and FIG. 3 may be present, and the number, type, and configuration of such components may vary. Several particular examples of additional complexity or additional variations are disclosed herein; these are by way of example only and are not necessarily the only such variations. The various program components illustrated in FIG. 2 and FIG. 3 may be implemented, in various embodiments, in a number of different manners, including using various computer applications, routines, components, programs, objects, modules, data structures, etc., which may be referred to herein as "software," "computer programs," or simply "programs."

Figure 4:
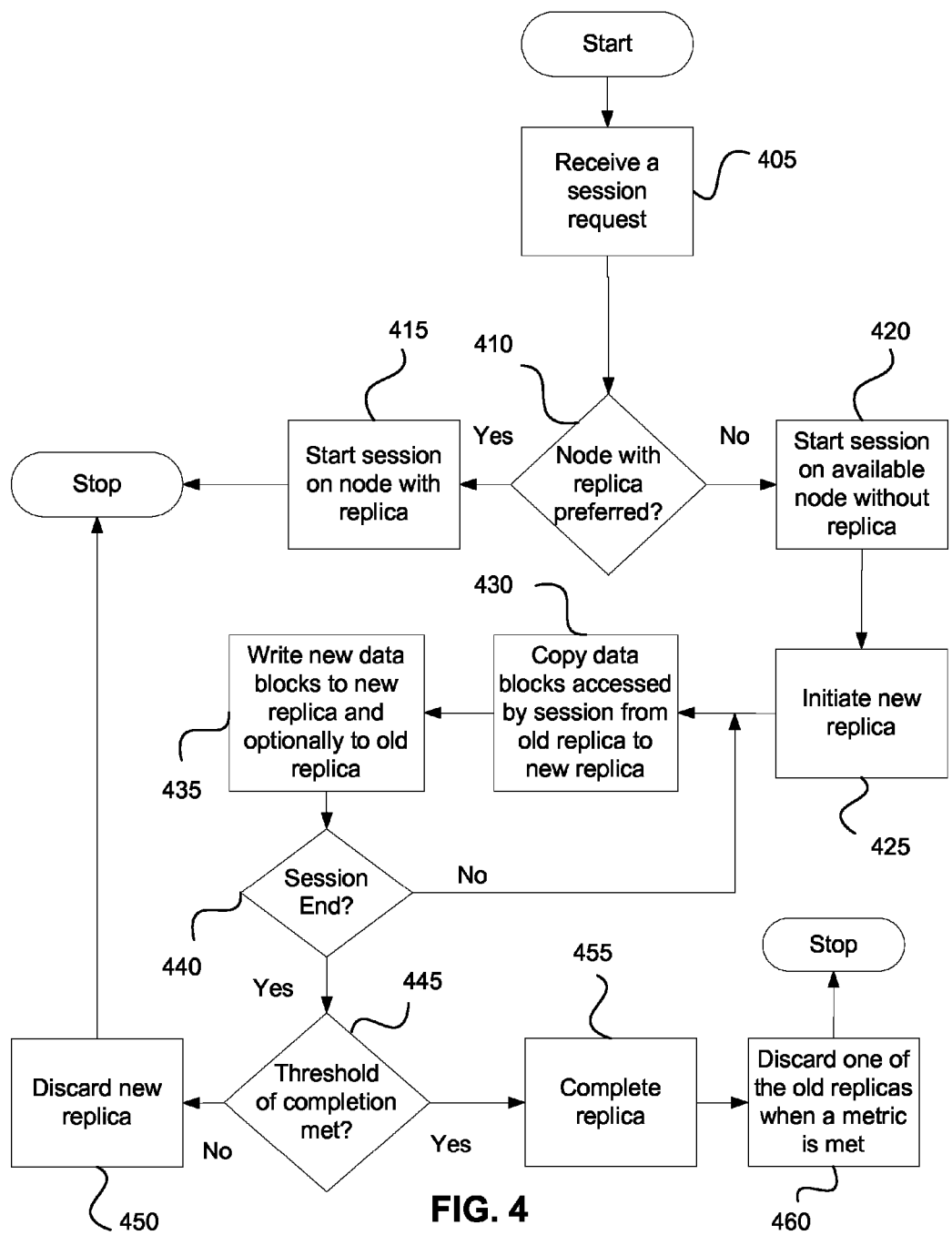
FIG. 4 illustrates a flowchart of a method of adaptive replica migration, according to various embodiments.

FIG. 4 illustrates a flowchart of a method 400 of replica migration in a distributed computer storage platform, according to various embodiments. The method 400 may create a new replica of a dataset on a compute node 120 that may have more processing resources than a compute node 120 that already has an existing replica. In operation 405, the method 400 of replica migration may begin when a distributed computer storage platform such as distributed computer storage platform 100 of FIG. 1 receives a request to begin an application session (such as application session 330 of FIG. 3) at a compute node or host server such as compute nodes 120 or host server 110 of FIG. 1. The request may come from a client computer such as client 105 of FIG. 1. The session 330 request may be a session 330 that uses a dataset that is on a storage module such as storage module 125 of FIG. 1. There may be the original dataset and one or more replicas of the original dataset on different storage modules 125 of the distributed computer storage platform 100.

A compute node 120 or a host 110 may use a scheduler 232 and user-defined metrics 234 of FIG. 2 to determine whether to begin the new session 330 on a compute node 120 that already has a replica of the dataset on its corresponding storage module 125. In operation 410, the compute node 120 or host 110 may determine whether a compute node 120 with a storage module 125 containing the replica meets a user-defined metric. The user-defined metrics 234 may define when a compute node 120 with a replica is to be used for the new session 330 or not. The user-defined metrics 234 may take into account a variety of distributed computer storage platform 100 environment factors such as, but not limited to: the number of sessions already executing on the compute node 125 with the replica of the dataset locally, current usage of network and processing resources, location of client 105, and high-availability requirements. If the current environment of the platform 100 is within the user-defined metrics 234, the compute node 120 with the existing replica may be preferred to run the session 330. If the current environment of the distributed computer storage platform is not within the user-defined metrics 234, a compute node 120 not having a replica may be preferred to run the session 330 and create a new replica there.

If the compute node 120 co-located with the replica is preferred, according to user-defined metrics 234, then the method 400 may continue to operation 415. In operation 415, the new session 330 may begin on the compute node 120 with the already existing replica and the method 400 may stop. This is because if the replica already exists, then starting the replica on a compute node that already has the replica located locally would not require a network transfer of the replica to another compute node 120. If the compute node 120 or nodes with the existing replicas of the dataset are not preferred, then method 400 may continue with operation 420. For example, the compute node 120 with the existing replica may be far from the client 105 or have too many existing sessions 330 using the replica, thus decreasing performance. Starting the session on a new compute node 120 may have better performance. In operation 420, a new session 330 may begin on a new compute node 120 co-located with a storage module 125 that does not contain a replica of the dataset. In various embodiments, the compute node 120 not containing a replica may be selected based off a user-defined metric 234. For example, the new compute node 120 may be a compute node 120 that is in the nearest proximity to the client 105, provides the fastest network connection, or most available computing resources.

In operation 425, a new replica may be created on the new compute node 120 for the new session 330. Initially, the replica may be an empty dataset of one of the old replicas of the dataset. In various embodiments, the new replica may be the only replica that can be directly modified by subsequent write operations. In operation 430, the session 330 may access one or more data blocks from an old replica to begin with since the new replica does not contain any data blocks. The session 330 may copy the accessed data blocks from the old replica into the new replica (copy-on-read/write). The old replica, from which the session is copying, may be a closest replica to the new replica, in various embodiments. The new replica may behave similar to a read cache. Future read operations for the same data blocks that were copied to the new replica may be served out of the new replica to the new session 330. In operation 435, new data blocks created by the session 330 may be written to the new replica. Depending on the consistency model, explained further below in the discussion of FIG. 8, the new data blocks created by the new session may be written back to the old replicas as well. The method may continue to operation 440.

In operation 440, the scheduler 232 may monitor the session 330 to determine whether or not it is has ended. If the session 330 has not ended, then method 400 may return to operation 430. Additional data blocks may be copied, read, and written in operations 430 and 435. If the session 330 has ended, then, in operation 445, the scheduler 232 may determine whether a threshold level of completion of the new replica has been met or other user-defined metric 234 in order to complete the new replica or discard it. The threshold level may be defined by the user-defined metrics 234. For example, if at least 25% of the data blocks have been copied to the new replica, then the new replica may be completed by copying the data blocks from the old replica when network resources are available. If the threshold level of completion is not achieved, then the method 400 may continue to operation 450. In operation 450, the scheduler 232 may discard the new replica and the method 400 may end. If the threshold of completion is met, then, in operation 455, the new replica may be completed by the scheduler 232. In operation 460, a copy of one of the old replicas may optionally be destroyed when a criteria is met after the new replica is completed. For instance, if one of the old replicas is not being used anymore by any session, then it may be destroyed. The method 400 may then end.

Figure 5:
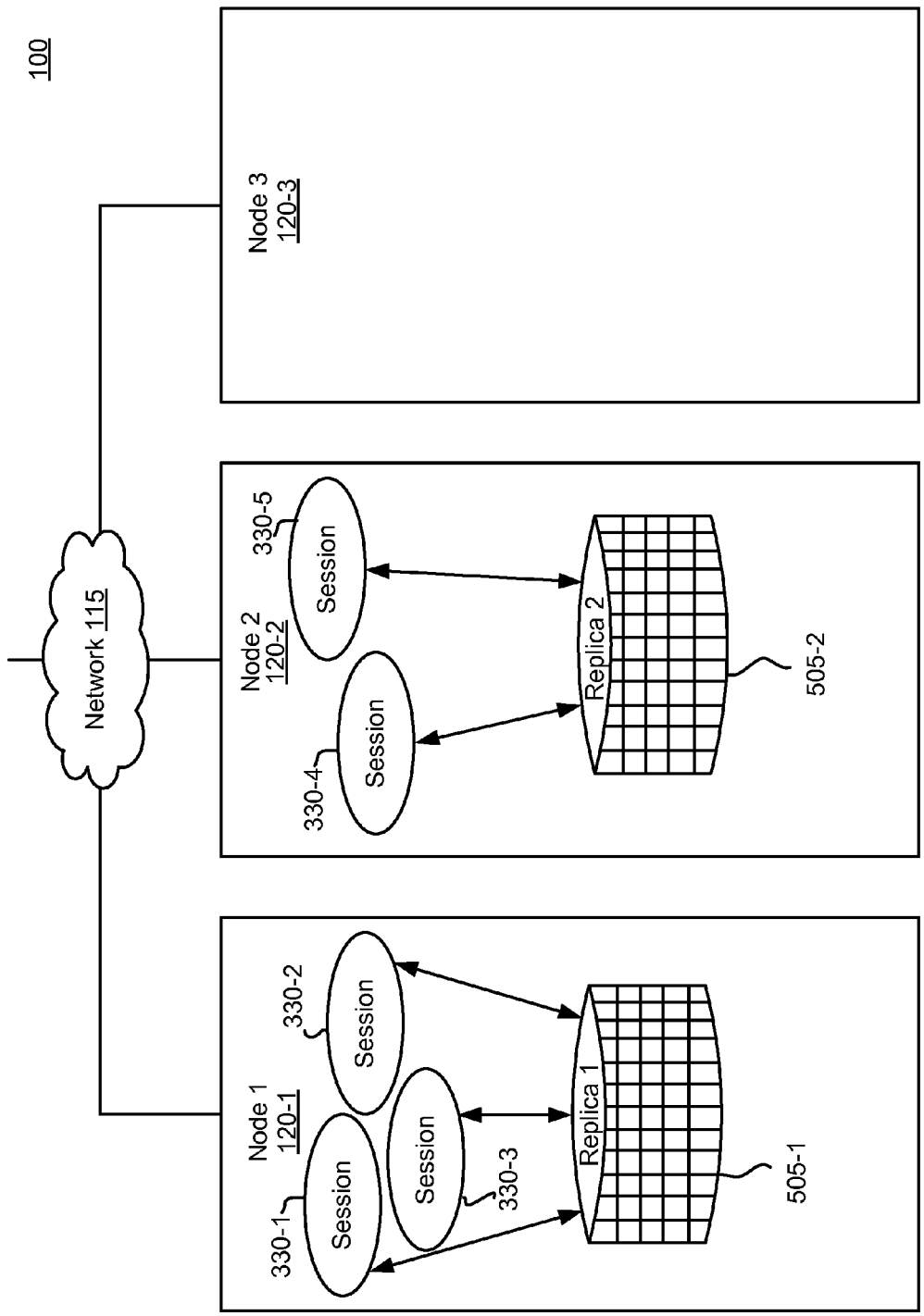
FIG. 5 illustrates a block diagram of a distributed computer storage platform before a new application session on a compute node not having a replica has begun, according to various embodiments.

FIG. 5-FIG. 10 illustrate a graphical scenario of the operations of method 400 of FIG. 4, according to various embodiments. FIG. 5 illustrates a block diagram of a distributed computer storage platform 100 before a new application session on a compute node not having a replica has begun, according to various embodiments. The distributed computer storage platform 100 may include a first compute node 120-1, a second compute node 120-2, and a third compute node 120-3. The first compute node 120-1 and the second compute node 120-2 may have one or more sessions 330-1, 330-2, 330-3, 330-4, and 330-5 of an application executing on the compute nodes 120-1 and 120-2. The sessions 330-1-330-5 may be reading and writing data blocks of a first replica 505-1 of a dataset stored on a first storage module and a second replica 505-2 of the dataset stored on a second storage module. The first replica 505-1 may be accessed by the first compute node 120-1. The second replica 505-2 may be accessed by the second compute node 120-2. Updates to changes to either replica 505-1 and 505-2 may be also distributed to the other replica depending on the consistency model of the data blocks. All of the compute nodes 120-1, 120-2, and 120-3 may be in communication through the network 115.

Figure 6:
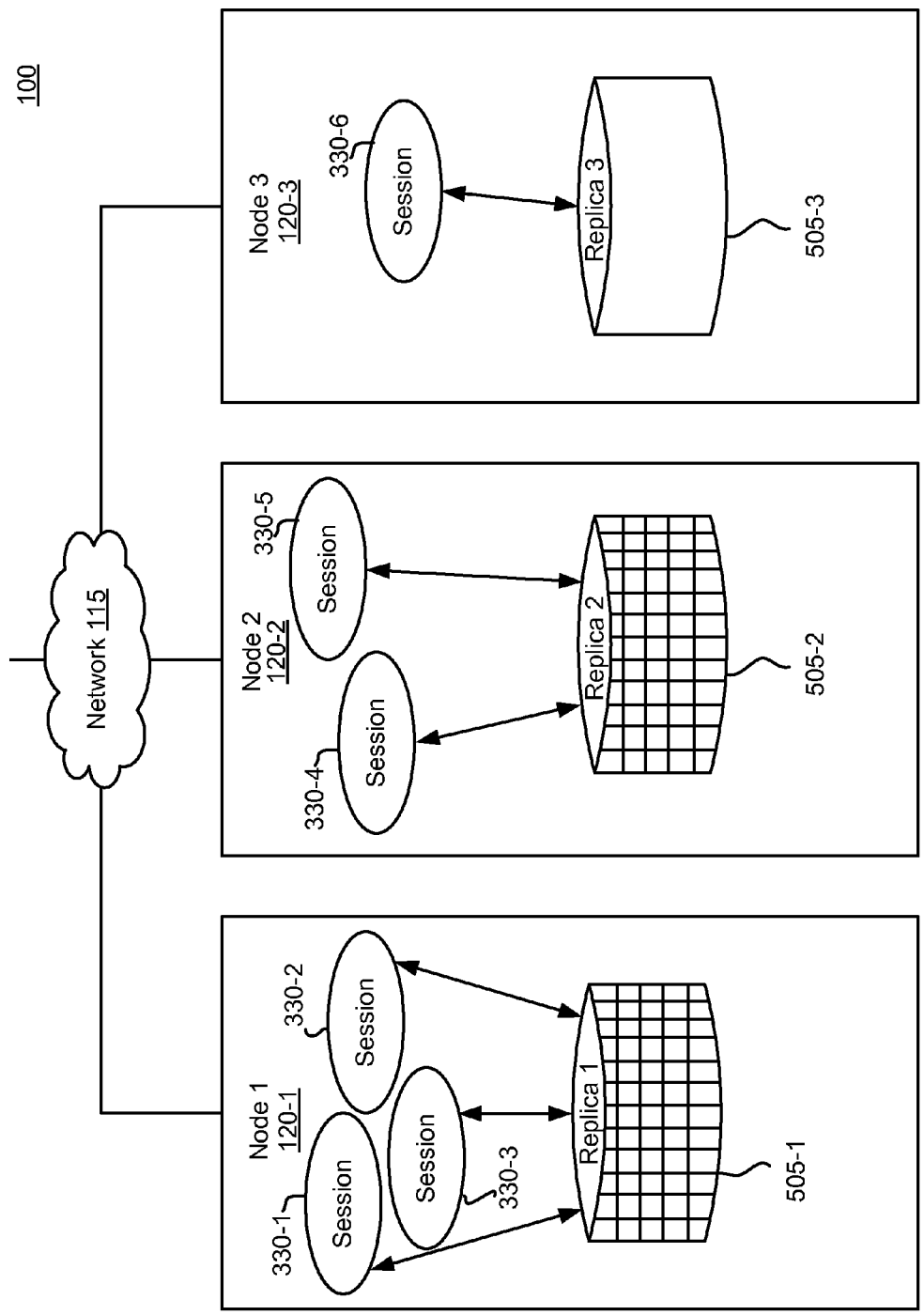
FIG. 6 illustrates a block diagram of a distributed computer storage platform, when a new session begins on a compute node where no replica exists in the storage module associated with the compute node, according to various embodiments.

FIG. 6 illustrates a block diagram of a distributed computer storage platform 100, when a new session 330-6 begins on the third compute node 120-3 where no replica exists on the storage module associated with the third compute node 120-3, according to various embodiments. A scheduler 232 on the compute nodes 120 or on a host server 110 (FIG. 1) may determine whether it is preferable to begin a new session, when requested, on the first compute node 120-1 or the second compute node 120-2. The scheduler 232 may determine where the session is going to start based on a user-defined metric that takes data locality, high-availability requirements, and current usage of resources such as processing and network resources into account. When the scheduler 232 determines that starting a new session on an underused compute node not having a local replica is preferred, then in the example in FIG. 6 the new session 330-6 may begin on the third node 120-3, which corresponds with operation 415 of FIG. 4. A new replica 505-3 may be created as well on the storage module associated with the third compute node 120-3. The new replica 505-3 initially does not contain any valid data blocks. In various embodiments, the new replica 505-3 may be the only replica that can be directly modified by subsequent write operations.

Figure 7:
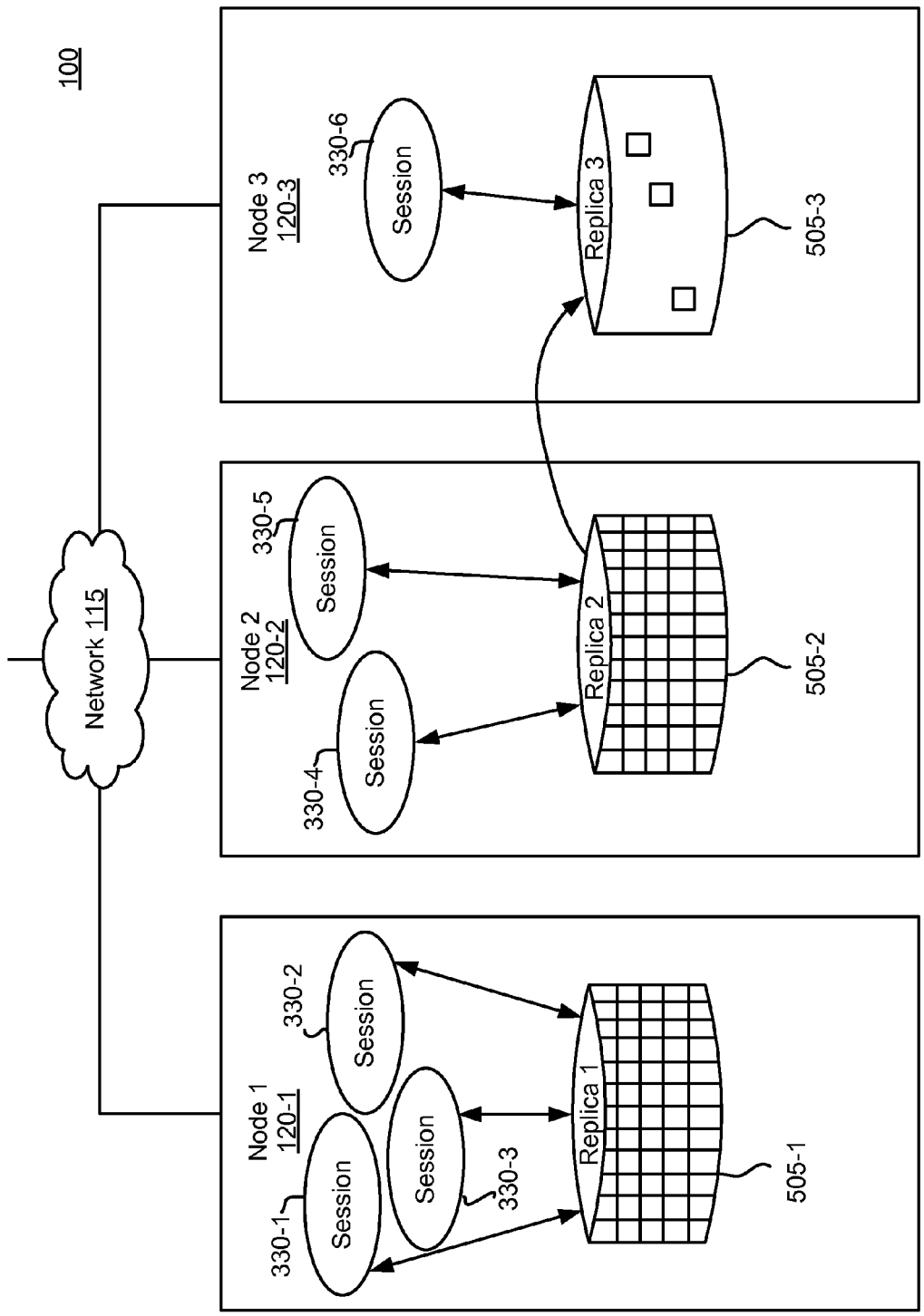
FIG. 7 illustrates a block diagram of the distributed computer storage platform, when a new replica obtains data blocks of the old replica, according to various embodiments.

FIG. 7 illustrates a block diagram of the distributed computer storage platform 100, when the new replica 505-3 starts obtaining data blocks of the old replicas 505-1 and 505-2, according to various embodiments. Since the new replica 505-3 does not contain any valid data blocks when it is created, the new session 330-6 may obtain data blocks from the first and second replicas 505-1 and 505-2 over the network 115. In various embodiments, the new session 330-6 may obtain data blocks from the nearest replica, second replica 505-2, for quicker accesses. In other embodiments, the new session 330-6 may retrieve data blocks from a particular replica or replicas based on some other user-defined metric 234. As the data blocks from one or more of the old replicas 505-1 and 505-2 are accessed by the new session 330-6, the data blocks may be copied into the third replica 505-3. The third replica may behave similar to a read cache. Future read operations of the same data blocks by the new session 330-6 may be served out of the new replica 505-3.

Figure 8:
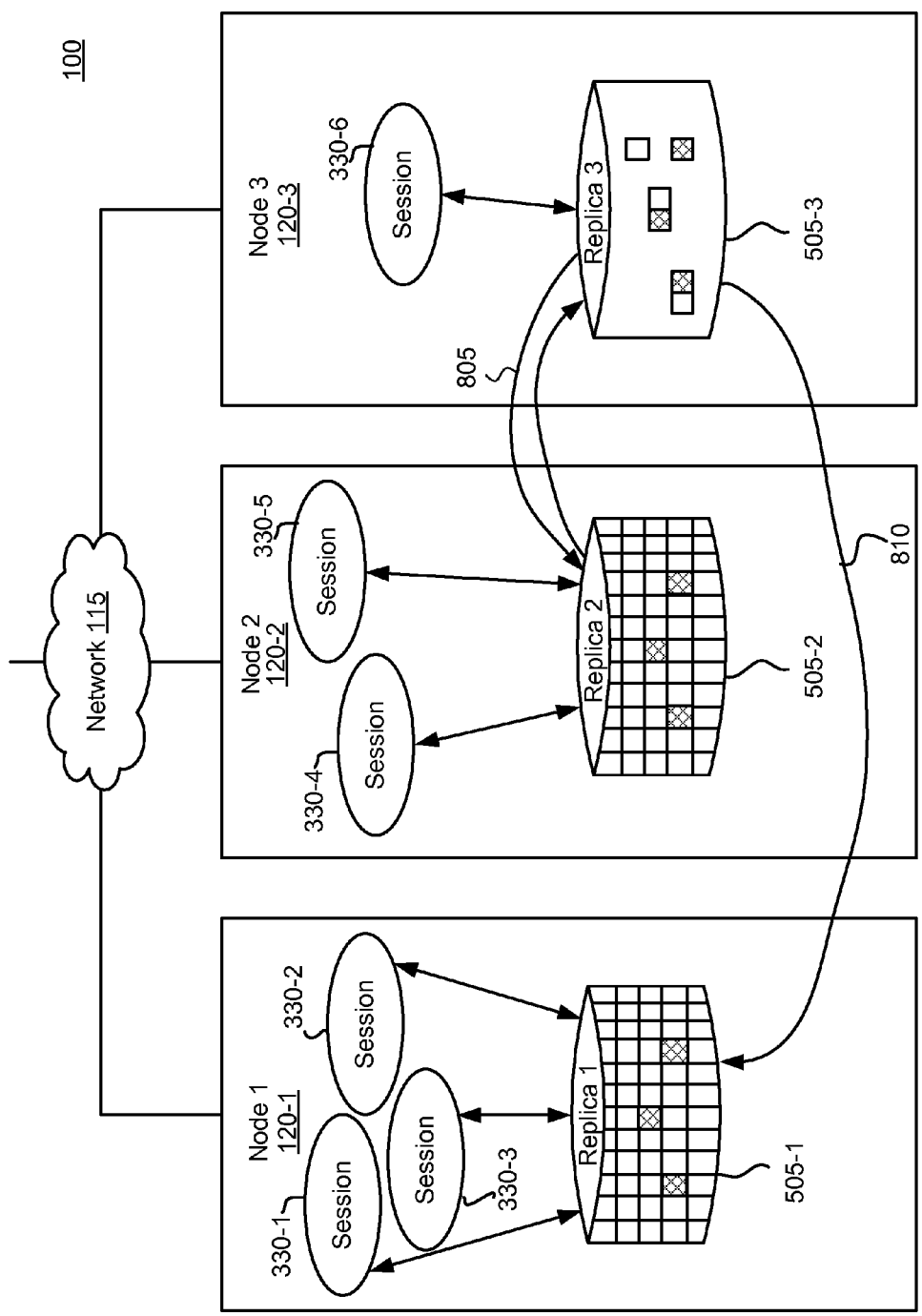
FIG. 8 illustrates a block diagram of the distributed computer storage platform, when the new session writes blocks to the new replica, according to various embodiments.

FIG. 8 illustrates a block diagram of the distributed computer storage platform 100, when the new session 330-6 writes blocks to the new replica 505-3, according to various embodiments. Depending on the consistency model of the distributed applications, new data blocks written to the new replica 505-3 by the session 330-6 may be written back to the old replicas 505-2 and 505-1 denoted by arrows 805 and 810, respectively.

A typical problem when replication is used is the consistency of data amongst the replicas. The ideal storage layer may provide full consistence at all times, i.e. any request of any application on a given replica that changes the replica will materialize on all replicas before any further read requests are served on these replicas. Depending on the nature and workload of distributed applications, running a fully consistent storage layer results in substantial programmatic effort and impact on operational performance and cost. However, not all applications require full consistency at all times and may instead operate on a consistency model where the data is eventually consistent, i.e. the replicas may be inconsistent but no longer than a specified timespan. In other situations, other applications may operate without any consistency for newly created replicas, i.e. the new replica continually diverges from the other replicas without impacting functionality of the overall cloud service.

These three consistency models, full consistency model, eventual consistency model, and no consistency model, may be the different classes of consistency for an underlying distributed computer storage platform 100. In a full consistency model all data is consistent at all times from the application's viewpoint. In an eventual consistency model the replica diverges for a limited period of time and is made consistent again with other replicas after a defined timespan. Updates, appends, deletes, that are not immediately materialized on all replicas are called deferred private operations. In an eventual consistency model, a master replica may be defined in the case of conflicting deferred private operations. In the no consistency model, some applications are required to operate on a dedicated replica on their own, but do not require consistency with other replicas. In this model, a replica may be considered a clone, but the underlying storage layer implements the clone effectively as a replica with no consistency requirements. If running without consistency, replicas may no longer be useful for high availability.

In FIG. 8, an eventual consistency model is illustrated. The new session 330-6 may write new data blocks to the third replica 330-3 as illustrated by the shaded boxes in the third replica. The new data blocks may be copied to the old replicas 505-1 and 505-2 over a specified timespan as indicated by arrows 805 and 810. This may provide for an eventual consistency between the replicas.

Figure 9:
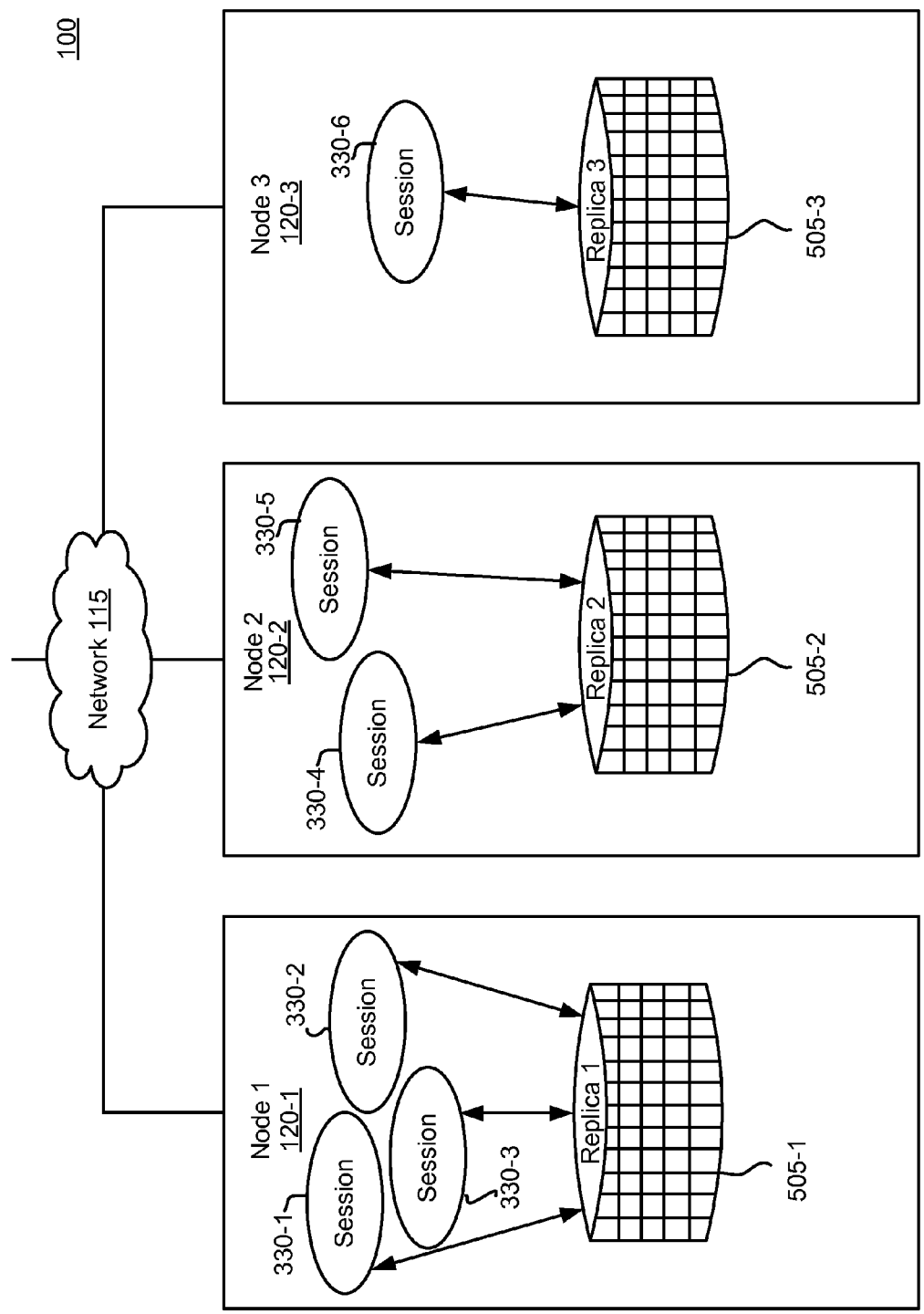
FIG. 9 illustrates the distributed computer storage system when the new replica is completed, according to various embodiments.

FIG. 9 illustrates the distributed computer storage system 100 when the new replica 505-3 is completed, according to various embodiments. The new replica 505-3 may be completed due to the session 330-6 lasting long enough for all of the data to transfer from the old replicas 505-1 and 505-2 to the new replica 505-3. In various embodiments, the session 330-6 may end before the new replica 505-3 is completed. In a situation where the session 330-6 has ended before the replica 505-3 has been completed, the scheduler 232 may determine based on the user-defined metrics 234 whether to complete, keep, and discard the replica 505-3, which corresponds with operation 445 of FIG. 4. For instance, a user-defined metric 234 may govern the scheduler 232 to complete the new replica 505-3 when at least 25% of the all data blocks have been copied to the new replica 505-3 and discard the new replica 505-3 when less than 25% of the data blocks have been copied to the new replica 505-3. Other user-defined metrics may influence when to complete the new replica 505-3. For instance, when sufficient network bandwidth is available the scheduler 232 may retrieve the remaining data blocks from the old replicas 505-1 and 505-2 to complete the new replica 505-3.

Figure 10:
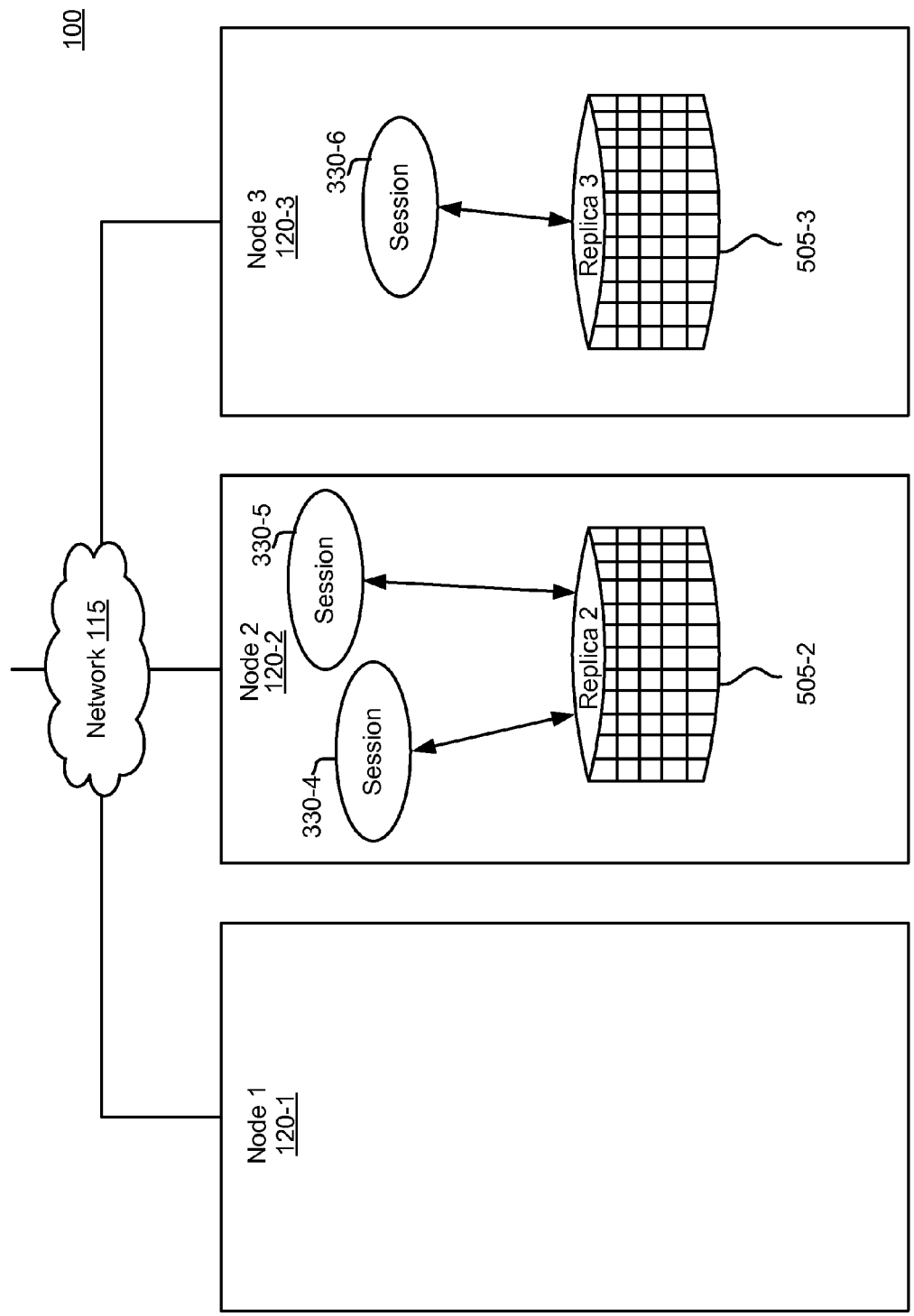
FIG. 10 illustrates the distributed computer storage system when the new replica is completed and an old replica is discarded, according to various embodiments.

FIG. 10 illustrates the distributed computer storage system 100 when the new replica 505-3 is completed and an old replica 505-1 of FIG. 5-FIG. 9 is discarded, according to various embodiments. If the new replica 505-3 is completed, then the scheduler 232 may destroy one of the old replicas such as replica 505-1. In other embodiments, the scheduler 232 may mark the old replica 505-1 obsolete so that it can be discarded at a later point in time based on a user-defined metric 234, e.g., when storage occupied by the old replica 505-1 is needed or sessions 330-1-330-3 have ended.

In various embodiments, the replicas are stored in a fragmented fashion. Each storage module 125 of a compute node 120 may contain one or multiple fragments of one or more replicas, but in order to have high availability the storage module 120 may not contain overlapping fragments of different replicas of the same file. The method 400 may be performed on a per-fragment basis instead of a per-replica basis.

Referring back to FIG. 2 and FIG. 3, embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
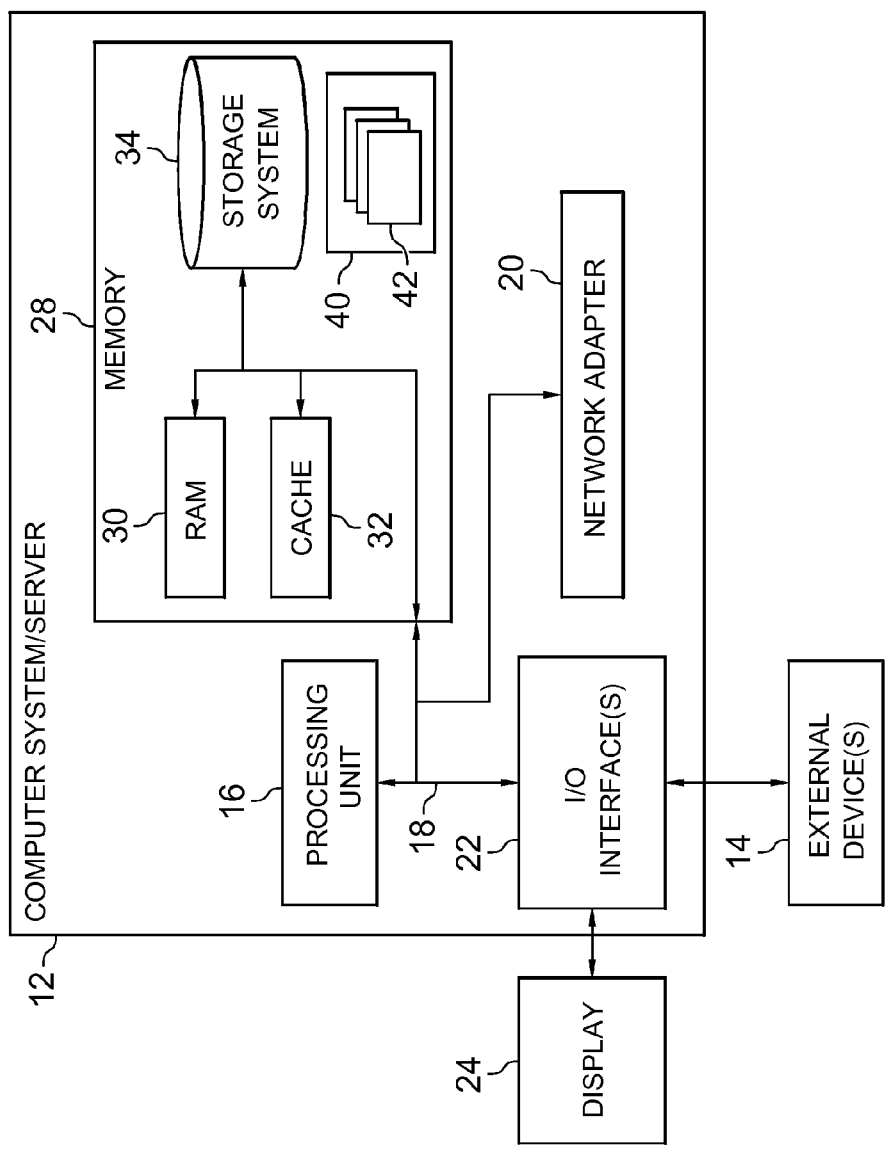
FIG. 11 illustrates a cloud computing node according to various embodiments.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
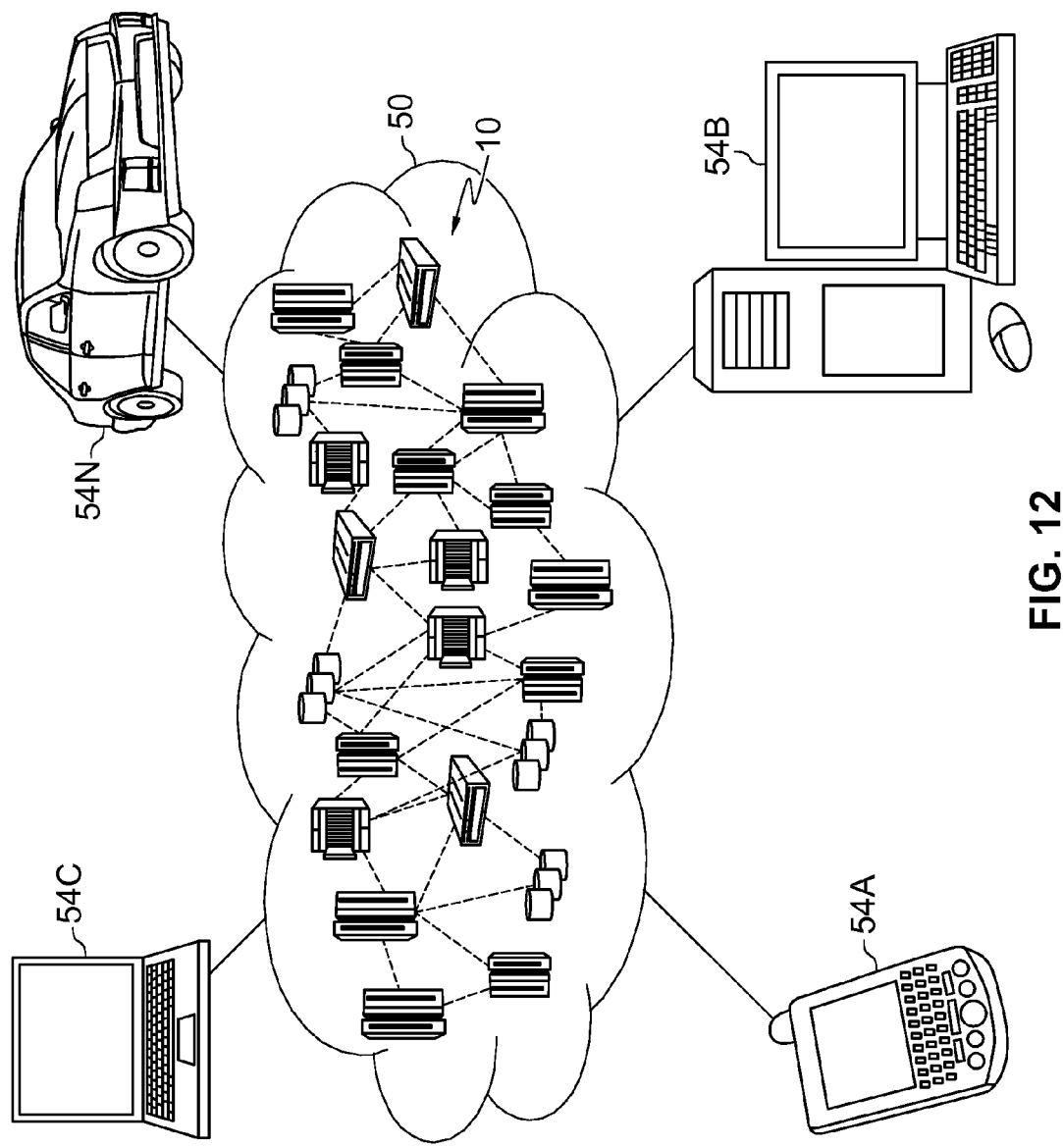
FIG. 12 illustrates a cloud computing environment, according to various embodiments.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
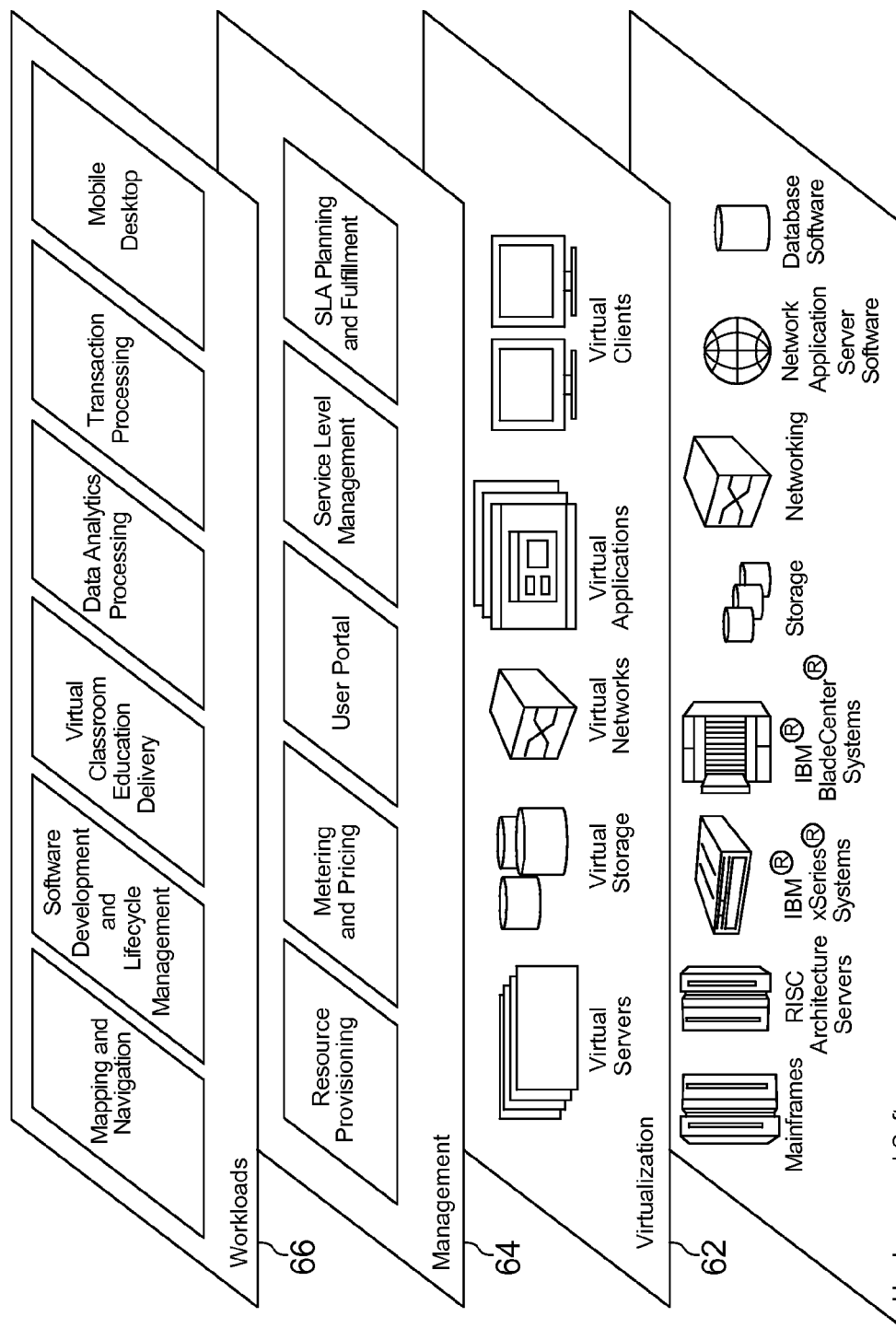
FIG. 13 illustrates an abstraction model layer, according to various embodiments.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Another example includes adaptive replica migration in distributed computer storage platforms.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A compute node, comprising:
 a processor; and
 a memory communicatively coupled to the processor, wherein the memory is encoded with instructions and wherein the instructions when executed by the processor include:
 identify a first compute node and a second compute node;
 start an application session on the first compute node when a first user-defined metric is met;
 determine an absence of a first replica of a dataset on the first compute node, wherein the first replica of the dataset is to be accessed by the application session, and wherein the first replica of the dataset comprises a set of data blocks;
 identify the first replica of the dataset on the second compute node;
 create a second replica of the dataset, the second replica of the dataset to be co-located with the first compute node, wherein the set of data blocks are absent from the second replica of the dataset;
 request, by the application session on the first compute node, a first data block of the dataset by the application session;
 identify, in the second replica of the dataset, an absence of a copy of the first data block of the first replica of the dataset;
 retrieve a first data block of the first replica of the dataset from the second compute node;

copy the retrieved first data block to the second replica; and read, in response to a request for the first data block by the application session, the first data block from the second replica, write a second data block created by the application session to the second replica;

write the second data block to the first replica, wherein writing the second data block to the first replica depends on a consistency model of the data block, wherein when the consistency model is a full consistency model, then the second data block will be written to the first replica when the second data block is written to the second replica, wherein when the consistency model is an eventual consistency model, then the second data block is written to the second replica and after a second user-defined metric is met, the second data block is written to the first replica, wherein when the consistency model is a no consistency model, then the second data block is written to the second replica, wherein in the full consistency model all data block is consistent at all times from the application's viewpoint, wherein in the eventual consistency model a replica diverges for a limited period of time and is made consistent again with other replicas after a defined timespan.

2. The compute node of claim 1, wherein the instructions when executed by a processor further include:

detect, before the second replica is completed, when the application session ends;

determine based on a user-defined metric whether to complete the second replica; and complete the second replica when a threshold of the user-defined metric is met.

3. The compute node of claim 1, wherein the instructions when executed by a processor further include:

receive a request to start the application session from a client;

start the application session on the second compute node having the first replica when a user-defined metric is met; and start the application session on the first compute node when a second user-defined metric is met.

4. The compute node of claim 1, wherein the instructions when executed by a processor further include:

delete the first replica when the second replica is completed and a user-defined metric is met.

5. A computer program product of replica migration of a dataset, the computer program product comprising a non-transitory computer readable storage medium having program code embodied therewith, the program code executable by a computer system to:

identify a first compute node and a second compute node;

start an application session on the first compute node when a first user-defined metric is met;

determine an absence of a first replica of a dataset on the first compute node, wherein the first replica of the dataset is to be accessed by the application session, and wherein the first replica of the dataset comprises a set of data blocks;

identify the first replica of the dataset on the second compute node;

create a second replica of the dataset, the second replica of the dataset to be co-located with the first compute node, wherein the set of data blocks are absent from the second replica of the dataset;

request, by the application session on the first compute node, a first data block of the dataset by the application session;

identify, in the second replica of the dataset, an absence of a copy of the first data block of the first replica of the dataset;

retrieve a first data block of the first replica of the dataset from the second compute node;

copy the retrieved first data block to the second replica; and read, in response to a request for the first data block by the application session, the first data block from the second replica, write a second data block created by the application session to the second replica;

write the second data block to the first replica, wherein writing the second data block to the first replica depends on a consistency model of the data block, wherein when the consistency model is a full consistency model, then the second data block will be written to the first replica when the second data block is written to the second replica, wherein when the consistency model is an eventual consistency model, then the second data block is written to the second replica and after a second user-defined metric is met, the second data block is written to the first replica, wherein when the consistency model is a no consistency model, then the second data block is written to the second replica, wherein in the full consistency model all data block is consistent at all times from the application's viewpoint, wherein in the eventual consistency model a replica diverges for a limited period of time and is made consistent again with other replicas after a defined timespan.

6. The computer program product of claim 5, wherein the program code executable by a computer system further includes:

detect when the application session ends before the second replica is completed;

determine based on a user-defined metric whether to complete the second replica; and complete the second replica when a threshold of the user-defined metric is met.

7. The computer program product of claim 5, wherein the program code executable by a computer system further includes:

receive a request to start the application session from a client;

start the application session on the second compute node having the first replica when a user-defined metric is met; and start the application session on the first compute node when a second user-defined metric is met.

* * * * *